Patented Nov. 21, 1933

1,935,724

UNITED STATES PATENT OFFICE 1,935,724

PRODUCTION OF VAT DYESTUFFS OF THE ANTHRAQUINONE ACRIDINE SERIES AND THE PRODUCTS THEREOF

Heinrich Neresheimer, Ludwigshafen-on-the-Rhine, Germany, assignor to General Aniline Works, Inc., New York, N. Y., a corporation of Delaware No Drawing. Application October 18, 1929, Serial No. 400,734, and in Germany October 26, 1928

5 Claims. (Cl. 260—36)

This invention relates to the production of new vat dyestuffs of the anthraquinone series.

I have found that valuable new vat dyestuffs are obtained by treating 2'-benzanthronyl-1-aminoanthraquinones containing at least one aliphatic carboxylamino group with acid condensing agents.

A great variety of acid condensing agents may be employed for the preparation of the new vat dyestuffs, as for example, concentrated or fuming sulfuric acids, chlorsulfonic acid, anhydrous aluminium chloride, and the like.

If desired, the preparation of the initial materials may be combined with the production of the new vat dyestuffs in a single operation, for example by treating a 2'-benzanthronyl-1-aminoanthraquinone containing a free amino group with an acylating agent and an acid condensing agent, as, for example, with acetic anhydride and aluminium chloride.

The new dyestuffs probably contain the ring system indicated by the following formula:

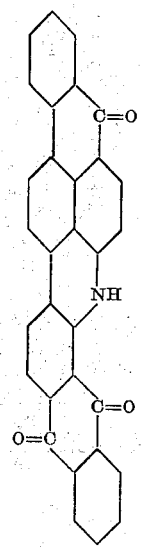

They dissolve in 82 per cent sulfuric acid with blue to violet colorations and dye cotton bluish green to olive shades from blue to violet hydrosulfite vats.

The following examples will further illustrate the nature of this invention, but the invention is not restricted to these examples. The parts are by weight.

Example 1

40 parts of ground aluminium chloride are introduced by portions into a boiling solution of 20 parts of 2'-benzanthronyl-1-amino-4-acetylaminoanthraquinone, obtainable by condensation of 2-chlorbenzanthrone with 1-amino-4-acetylaminoanthraquinone, in 800 parts of trichlorobenzene. The whole is boiled for a short time. After cooling, the liquid is decanted from the resinous precipitate, which is then treated with steam and hydrochloric acid in order to decompose the admixed aluminium compounds and to remove the adherent trichlorobenzene. The dyestuffs thus obtained may be purified for example by warming with an alkaline solution of hydrosulfite, filtering this solution and subsequently introducing air. The pure dyestuff is a dark green powder. It dissolves in hot high boiling organic solvents, for example nitrobenzene, giving a green coloration, and in sulfuric acid of 82 per cent strength giving a reddish blue coloration. From a bluish violet vat the dyestuff dyes cotton green shades.

The formation of the dyestuff may also be effected by other acid condensing agents, as, for example, chlorsulfonic acid or fuming sulfuric acid. In these cases it is advisable not to employ temperatures higher than necessary in order to prevent undesired secondary reactions, as, for example, the introduction of sulfonic acid groups.

Dyestuffs similar to that described are obtained by employing 2'-benzanthronyl-1-amino-4-n-butyrylaminoanthraquinone or 2'-benzanthronyl-1-amino-4-acetylamino-6-chloranthraquinone instead of the 2'-benzanthronyl-1-amino-4-acetylaminoanthraquinone.

Example 2

A mixture of 20 parts of mono-(2'-benzanthronyl-)-1.4-diaminoanthraquinone corresponding to the formula

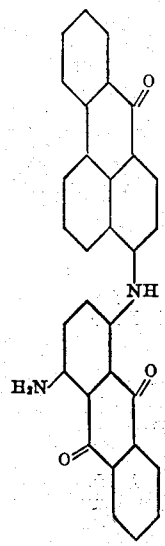

8 parts of acetic anhydride, 200 parts of nitrobenzene and 60 parts of anhydrous aluminium chloride is heated on the water bath until the formation of the dyestuff is complete, whereupon the mixture is diluted with ethyl alcohol. The dyestuff is then filtered off and purified, as described in Example 1. It is practically identical with the dyestuff obtained according to Example 1.

Example 3

20 parts of 2'-benzanthronyl-1-amino-4-acetylaminoanthraquinone (obtainable by the condensation of 2-chlorobenzanthrone with 1-amino-4-acetylaminoanthraquinone) are dissolved in 160 parts of chlorsulfonic acid while stirring at from 20° to 25° C. The solution is stirred for from 3 to 4 hours at the same temperature, and 200 parts of sulfuric acid of approximately 62 per cent strength are allowed to flow into it. When the evolution of hydrogen chloride has ceased, the red violet sulfate which separates is filtered off and is converted into the dyestuff by treatment with water. The dyestuff is identical with that obtainable according to Examples 1 and 2.

Other acid condensing agents, such as sulfuric acid monohydrate or fuming sulfuric acid may be employed instead of chlorsulfonic acid.

What I claim is:—

1. The process of producing new vat dyestuffs, which comprises acting on a 2'-benzanthronyl-1-aminoanthraquinone containing an aliphatic carboxylamino group in the 4-position of the anthraquinone radicle with an acid condensing agent.

2. The process of producing new vat dyestuffs, which comprises acting on a 2'-benzanthronyl-1-amino-anthraquinone containing an acetylamino group in the 4-position of the anthraquinone radicle and which may contain a halogen atom in the anthraquinone radicle with an acid condensing agent.

3. The process of producing new vat dyestuffs, which comprises acting on 2'-benzanthronyl-1-amino-4-acetylaminoanthraquinone with an acid condensing agent.

4. The vat dyestuffs which contain probably the ring system indicated by the following formula:

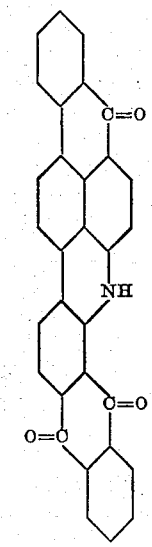

which dissolve in 82 per cent sulfuric acid with reddish blue to violet colorations and dye cotton bluish green to green shades from blue to violet hydrosulfite vats, and which contain an aliphatic carboxyamido group in the 4-position of the anthraquinone radicle.

5. The vat dyestuff, which contains probably the ring system indicated by the following formula:

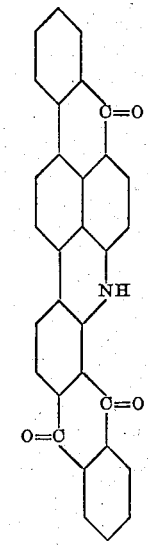

which dissolve in 82 per cent sulfuric acid with a reddish blue color and dyes cotton green shades from a bluish violet hydrosulfite vat, and which contains an acetamido group in the 4-position of the anthraquinone radicle.

HEINRICH NERESHEIMER.